LUCIEN PRÉAUX
LÉO BRED
   INVENTORS.

BY  *Karl F. Ross*
       ATTORNEY

United States Patent Office 3,421,968
Patented Jan. 14, 1969

1

3,421,968
ORNAMENTAL GLASS SLAB CONTAINING FLAT
GLASS STRIPS
Lucien Préaux and Léo Bred, Boussois-sur-Sambre,
France, assignors to Glaces de Boussois, Paris,
France, a corporation of France
Filed Apr. 5, 1965, Ser. No. 445,392
Claims priority, application France, Apr. 7, 1964,
969,947/64
U.S. Cl. 161—5      2 Claims
Int. Cl. B44f 1/06

ABSTRACT OF THE DISCLOSURE

To make an ornamental glass slab, thin strips of glass (possibly colored) are randomly disposed on a casting surface whereupon glass is poured onto that surface to envelop the strips and fuse onto them without obliterating their outlines.

---

Figure 1:
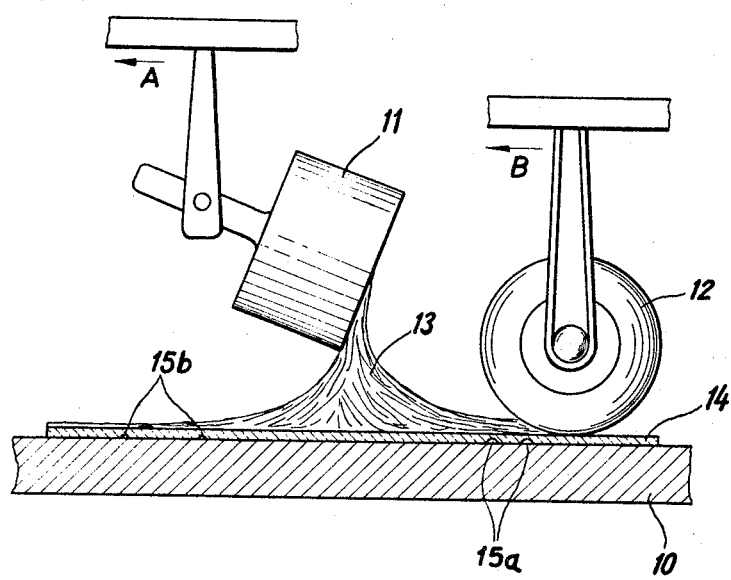

Our present invention relates to an ornamental glass slab, more particularly a translucent (and, if desired, partly transparent) slab adapted to be used as a flagstone, decorative wall or other plate structure incorporating a specific design.

The general object of our present invention is to provide an expeditious method of manufacturing such plate structures with a diversity of decorative designs, including multicolored patterns.

Another object of this invention is to provide a slab of this character which, before final hardening, can be conveniently flattened, bent or otherwise shaped in substantially the same manner as conventional sheet glass.

In accordance with this invention we arrange a multiplicity of elongated glass elements, identical or different in shape, on a casting table in a generally planar pattern or array whereupon a flow of vitreous melt is directed onto the table surface into contact with these elements until the latter are completely immersed in the flow; upon subsequent cooling, the melt solidifies into a coherent mass of composite character having the aforementioned elements embedded therein.

With this mode of manufacture, the strips or other elongated elements are substantially flush with one surface of the resulting slab, i.e. the surface corresponding to the underside of the fluid mass deposited on the casting table, the opposite surface of the slab having the smooth appearance of a cast glass sheet. The elements arrayed on the surface of the casting table may, if desired, intersect or overlap to a limited extent compatible with a generally planar pattern; thus, if these elements are thin ribbons or strips, the designer will have greater freedom in his choice of pattern.

The decorative glass elements embedded in the cast sheet may extend across the full length or width of the sheet or only over a fraction thereof. They may also be distinctively colored, e.g. by the admixture of suitable pigmentation with a composition identical with or similar to that, forming the melt. In any case it will be desirable to use glasses having substantially the same thermal co-

2 efficient of expansion for both the melt and the elements; if no distinct coloration is required, this condition is most easily met by drawing the elements directly from the pot of the glass furnace from which the melt is subsequently poured.

Regardless of the shape of the elongated elements and the type of pattern in which they are arranged, these elements will always be partly embedded in the surrounding glass mass which, while still in its molten state, heats the surface of the elements to a temperature high enough to cause fusion between the elements and the mass. This fusion, however, will not be so complete as to obliterate the original boundaries therebetween, thus preserving the visual pattern even in the absence of distinctive coloration. If the elements are of different width and/or thickness, thus of different cross-sectional area, it will generally be desirable to place the elements of larger cross-sectional area upstream on the casting table with reference to the elements of smaller cross-sectional area in order that the former should encounter the incoming flow at a higher temperature for more effective fusion.

Figure 2:
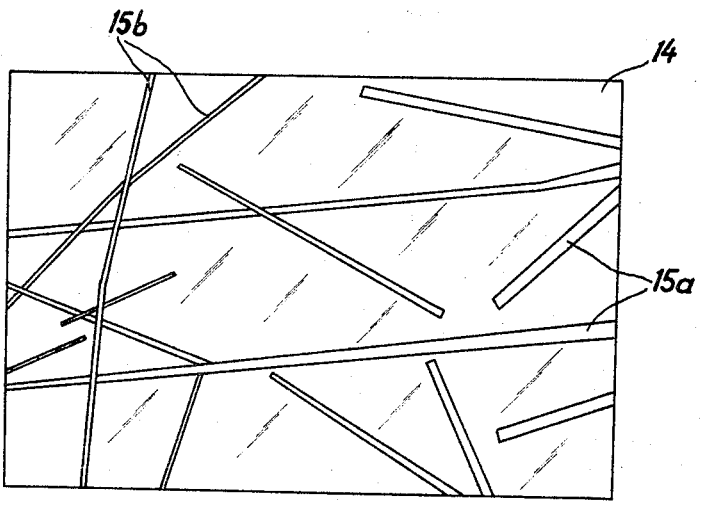

The invention will be further described with reference to the appended drawing in which:

FIG. 1 is a somewhat diagrammatic view of a system for making ornamental glass slabs according to our invention; and FIG. 2 is a bottom view of a glass slab produced by the system of FIG. 1.

In FIG. 1 we have shown part of a casting table 10, of conventional construction, onto which a mass of molten glass 13 is poured from a ladle 11 displaced across the table 10 in the direction of arrow A; a smoothing cylinder 12 follows the ladle 11 (arrow B) to flatten the glass mass into a sheet 14.

On the casting table 10 we deposit an arbitrary pattern or array of glass strip 15a, 15b (see also FIG. 2), the strip 15a being wider than the strips 15b and being therefore positioned closer to the upstream (i.e. right-hand) end of table 10 where the pouring begins and where the glass is therefore hotter. The strips 15a, 15b may have been obtained previously, e.g. from ladle 11, by being manually drawn from the vitreous melt 13.

EXAMPLE

A vitreous mass of about 900 kg. is heated above its melting point in a furnace, a quantity of 1.5 to 2 kg. thereof being drawn out to form strips of variable lengths and of different widths ranging between 2 and 5 mm.; the thickness of these strips is a small fraction thereof, e.g. 0.1 mm. for the narrower strips 15b (2 mm. wide) and 0.5 mm. for the wider strips 15a (5 mm. wide). The thickness of the poured slab 14 ranges between about 20 and 25 mm.; these proportions have been exaggerated in the drawing for the convenience of illustration.

It will be apparent that a slab so produced exhibits different light transmissivity in different parts of the pattern, depending on whether strips 15a or 15b are present and to what extent, if any, these strips intersect or overlap. The strips, or some of them, may differ in color from the surrounding matrix and/or from one another, according to the choice of the designer.

We claim:
1. An ornamental glass slab comprising a flat solid glass sheet having a pattern of flat elongated glass strips with visible outlines and of substantially the same composition as said sheet embedded in one surface thereof, the thickness of said strips being substantially less than that of said sheet.
2. An ornamental glass slab comprising a flat solid glass sheet having a pattern of flat elongated glass strips of distinctive color and of substantially the same composition as said sheet embedded in one surface thereof, the thickness of said strips being substantially less than that of said glass sheet.

References Cited

UNITED STATES PATENTS

| 2,311,613 | 2/1943 | Slayter | 161 |
| 2,449,952 | 9/1948 | Pridham | 65—4 |
| 2,643,437 | 6/1953 | Parker | 65—4 |
| 3,256,124 | 6/1966 | Peyches | 65—4 |
| 3,328,230 | 6/1967 | Levecque et al. | 65—4 |

DONALL H. SYLVESTER, *Primary Examiner.*

E. R. FREEDMAN, *Assistant Examiner.*

U.S. Cl. X.R.

65—4, 62; 106—47, 50; 161—162